Figure 1:
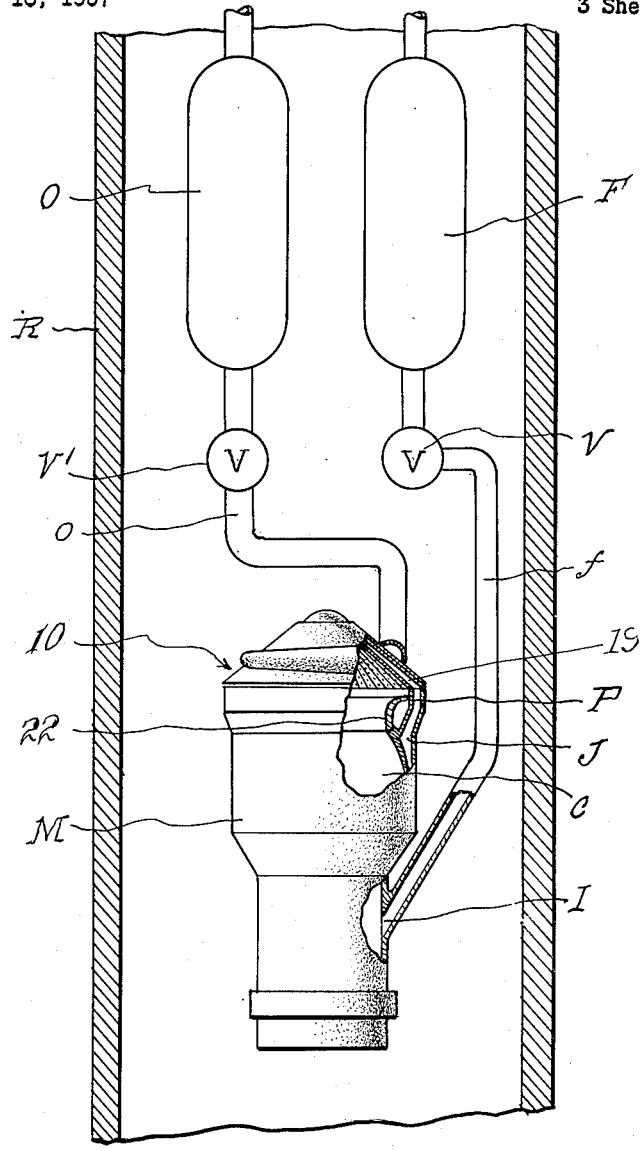

March 21, 1961 Z. FOX 2,975,591
CONICAL INJECTOR FOR ROCKET MOTORS
Filed Dec. 18, 1957 3 Sheets-Sheet 1

Inventor:
Zola Fox

BY William R. Wright
Agent

March 21, 1961 Z. FOX 2,975,591
CONICAL INJECTOR FOR ROCKET MOTORS
Filed Dec. 18, 1957 3 Sheets-Sheet 2
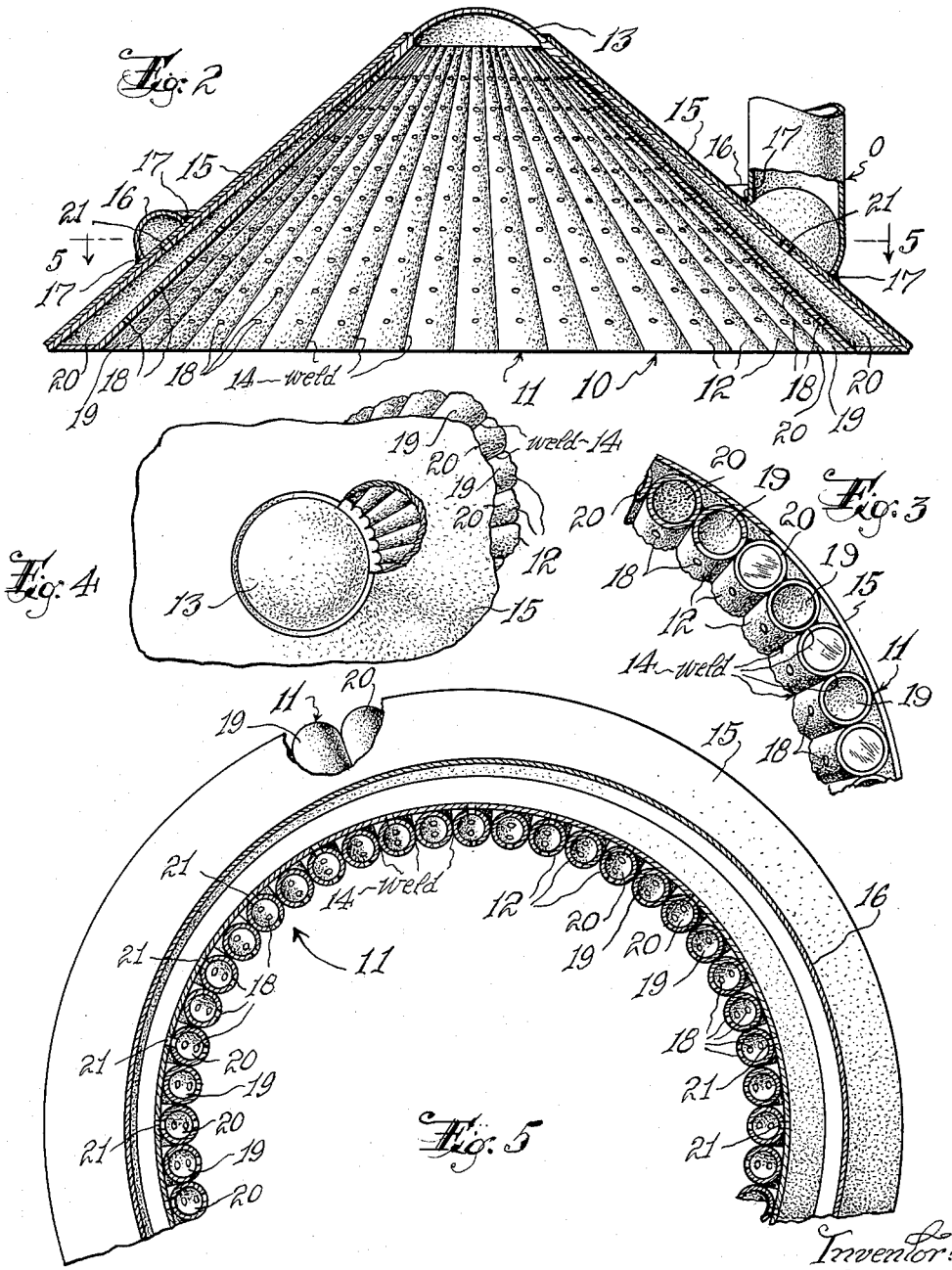
Inventor:
Zola Fox
BY William R. Wright, Jr.
Agent

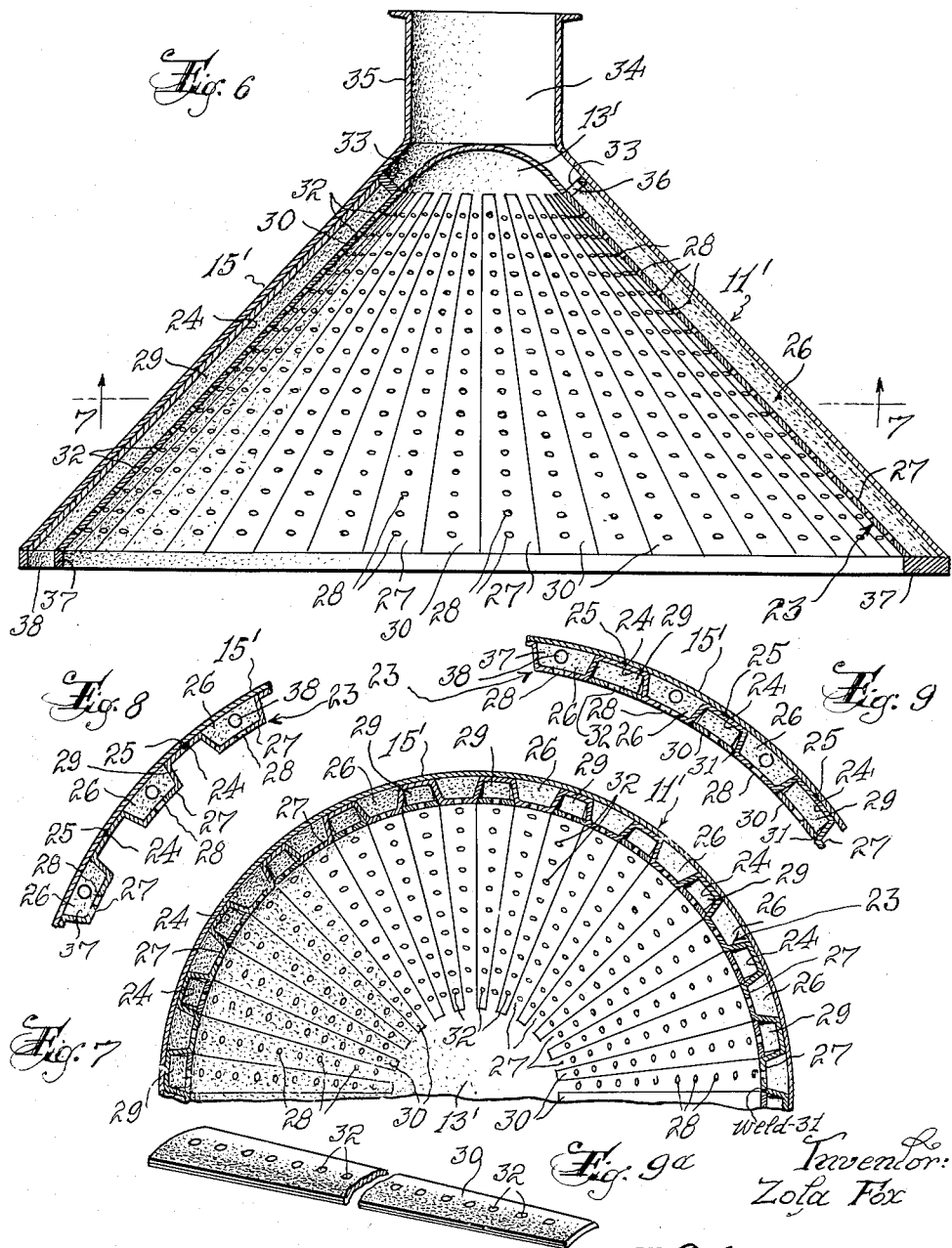

United States Patent Office 2,975,591
Patented Mar. 21, 1961

2,975,591

CONICAL INJECTOR FOR ROCKET MOTORS

Zola Fox, Verona, N.J., assignor, by mesne assignments, to Thiokol Chemical Corporation, a corporation of Delaware Filed Dec. 18, 1957, Ser. No. 703,705

6 Claims. (Cl. 60—35.6)

The invention relates to liquid propellant injectors for rocket motors.

An efficient type of injector head sometimes used is of hemispherical form, but its fabrication involves special manufacturing processes which greatly increase the difficulties encountered, the time consumed, and the ultimate cost. To be more explicit, the separate passageways for conduction of the individual propellants to the injection orifices from the respective inlet manifolds must be longitudinally curved and therefore extremely difficult to produce by conventional processes, such as by drilling, in a solid block of hemispherical design. Moreover, to unite curved, substantially parallel, passageway-forming tubes into a hemispherical structure by welding process would require tedious hand welding or expensively tooled welding along the contiguous areas rather than the more desirable fusion welding which may be practiced when the meeting faces to be united follow a straight line.

It, therefore, is the primary object of my present invention to provide an injector head of conical form which will be a highly efficient substitute for the previously employed hemispherical head and may be fabricated by fusion welding of the contiguous areas of axially straight tubes or equivalent passageway-forming structural means.

In addition to the practicability of fusion welding permitted by the use of straight tubing, or its equivalent, there is the further advantage that the injection orifices in the passageway-forming means may be produced by multi-press drilling operations instead of by the radial drilling required in fabrication of a hemispherical head.

The apparent advantages of my improved conical injector head construction may be summarized as: (1) ease of fabrication (compared to hemispherical heads); (2) amenability to shut-off valves at least for the smaller engines; and (3) adaptability to variable injection orifice area or geometry.

Further objects, advantages and features of the invention will become apparent as the following specific description is read in connection with the accompanying drawings, in which:

Fig. 1 is a semi-diagrammatic longitudinal sectional view of a rocket having a motor with regenerative cooling jacket installed therein and showing one embodiment of the improved conical injector head applied to the combustion chamber of the motor.

Fig. 2 is a large-scale axial section of the embodiment of injector head illustrated in Fig. 1; Fig. 3 is a fragmentary elevational view of the motor-abutting end of the same; Fig. 4 is a similar view of the opposite end of the head; and Fig. 5 is a transverse section on line 5—5 of Fig. 2.

Fig. 6 is a large-scale axial section of a modified form of conical injector head constructed in accordance with the present invention; Fig. 7 is a fragmentary transverse section on line 7—7 of Fig. 6; Fig. 8 is a detail radial section of a portion of the head, showing the manner in which the basket is united with the backing member;

Fig. 9 is a similar view, showing the method of uniting the fuel orifice plates to the basket; and Fig. 9a is a plan view of one of the fuel orifice plates.

Referring now in detail to the drawings, wherein like reference characters designate corresponding parts in the several views, Fig. 1 represents semi-diagrammatically the body R of a rocket having an installed motor M of typical regenerative cooling jacket construction that is supplied with the liquid propellants required for combustion from fuel tank F and oxidizer tank O by feed lines f and o, respectively, through remotely-controlled valves V and V'.

Fuel feed line f communicates with inlet port I of cooling jacket J in the vicinity of the nozzle of motor M. For adaptation to my improved conical injector head, cooling jacket J should have plural outlet ports P that are evenly spaced circumferentially to the same degree as the mouths of the fuel passageways of the injector head, one embodiment of which will now be described in detail.

The injector head 10 represented in assembled relation to the combustion chamber C of motor M in Fig. 1 is shown more completely on a larger scale in Figs. 2 to 5, inclusive. According to this disclosure, it should be apparent that the passageway-forming means 11 of injector head 10 is composed of the required number of tapered metallic tubes 12, which are arranged in the geometric form of the frustum of a cone with their smaller ends converging inwardly and united by a sealed joint with an apical cap 13. The tubes of each adjacent pair are contiguous, or in close abutment, and united one to the other by an impervious joint, which may be readily effected by automatic fusion welding as at 14 due to the straight-line area of juncture between contiguous tubes.

The passageway-forming means 11 constituted by the interwelded organization of tubes 12 is fitted into a backing member 15, which preferably is a cold-rolled sheet-metal frustum of a cone. Backing member 15 supports an encircling and internally flattened collector ring 16, which is adapted to be in communication with oxidizer feed line o, as shown. Collector ring 16 may be united with backing member 15 conveniently and with adequate sealing effect by marginal spot welding as at 17. This spot welding additionally serves to unite backing member 15 and the several tubes 12 of passageway-forming means 11.

Tubes 12 are all provided with injection orifices 18 in their opposed inner walls. The precise pattern of these orifices 18 will depend upon the functional type of injector that is being produced, i.e. impinging stream, doublet impinging, non-impinging, self-impinging, etc. However, alternate tubes 12 are used to form passageways 19 and 20, respectively, for fuel and oxygen, so every other tube 12 and backing member 15 at points opposite to the flat side of collector ring 16 are drilled to provide oxygen orifices 21.

The tubes 12 which intervene between the adjacent oxygen tubes, that are in communication with collector ring 16 through orifices 21, have their outer ends connected with registering outlet ports P of the cooling jacket J of motor M (Fig. 1). The mode of connection of injector head 10 to motor M which may be adopted in practice is not precisely disclosed and admits of wide choice. The use of an annular connecting throat member 22 integral with passageway-forming means 11 to fit the mouth of combustion chamber C of motor M is merely suggested.

Figs. 6 to 9a, inclusive, disclose a modified conical injector head in which the passageway-forming means 11' differs from the previously described embodiment principally in that it is not fabricated by the joining of separate tubes. Instead, a sheet-metal basket 23 is fitted inside a substantially conical backing, or cover, member 15'. Basket member 23 is made of a developed cone indented to form corrugation-like impressions. The alternately outwardly presented corrugation ridges 24 are united by spot welding at 25 to backing member 15' in such a manner that the grooves 26 therebetween serve as oxygen passageways. The inwardly presented ridges 27 are drilled in the desired pattern to provide oxygen injection orifices 28.

The inwardly presented grooves 29 are closed along their inner sides to form fuel passages by welding the side edges of simple truncated triangular orifice plates 30 to the adjacent inwardly presented ridges 27 of basket 23 as at 31. Plates 30 are provided in the required pattern with fuel injection orifices 32. Since the primary welds 31 that fasten the orifice plates 30 to basket 23 are straight-line welds, automatic fusion welding may be readily employed.

For like-on-like, or self-impinging, injection, orifice plates 30 may be pre-drilled and de-burred from the fuel propellant side prior to welding. Oxygen injection orifices 28 may be drilled at any time, since backing member 15' is assembled with basket 23 last. These orifices 28 are drilled from the oxygen propellant side for any type of injection pattern.

Interpropellant welds are fully eliminated by use of welded tabs 33 in oxygen and fuel passageways 26 and 29, respectively, which provide a void vented to the inner manifold chamber 34 between the inner ends of propellant passageways 26—29. This manifold chamber 34 is defined by apical cap 13', tabs 33 and a tubular neck 35, which latter is adapted to be connected to oxygen feed line o.

Tabs 33 are provided with through holes 36 opposite to the ends of oxygen passageways 26 to permit communication between manifold chamber 34 and said passageways in order to supply oxygen to the latter.

The larger end of basket 23 is closed by an annular wall 37 which is provided with through holes 38 in communication with fuel passageways 29. When wall 36 is arranged so that the respective holes 38 are in registration with fuel outlet ports P of cooling jacket J of motor M during assembly of injector head 10 with the latter, the fuel propellant can enter the fuel passageways 29.

An injector head constructed in accordance with either of the disclosed embodiments of my present invention is basically a comprise between a flat head and a hemispherical head injector. It features the structural advantage of a conical head over a flat head and does not impose the serious fabrication penalties of a hemispherical head. The design is intended also to employ relatively thick material on the injector face for reasonable orifice length-diameter ratios. Consequently, for like-on-like injection, drilling and de-burring of the injection orifices from the propellant side prior to final assembly is possible.

While there have been shown and described and pointed out the fundamental novel features of this invention as applied to only two structural embodiments, it will be understood that various omissions and substitutions and changes in the form and details of the device illustrated and its operation may be made by those skilled in the art without departing from the spirit of the invention. It is the intention, therefore, to be limited only as indicated by the scope of the following claims.

I claim:

1. An injector head for a rocket motor comprising: structural means forming the walls of plural contiguous propellant passageways arranged in the configuration of the circumference of a cone and being individually straight and collectively apically convergent in such a manner that in assembled condition contiguous areas of said passageways forming structural means abut in straight lines lying in axial planes in the frustum of a cone; means integrally uniting said contiguous areas; the wall means of all passageways being provided with radially inwardly directed injection orifices; and means to supply chemically cooperative different propellant fluids to alternate passageways around said circumference.

2. An injector head for a rocket motor as defined in claim 1, wherein each passageway is tapered toward the apical portion of the head.

3. An injector head for a rocket motor as defined in claim 1, wherein the passageway wall forming structural means is constituted by plural straight tubes united by fusion welding along the straight lines of adjacent tube contiguity.

4. An injector head for a rocket motor as defined in claim 1, wherein a backing cone of sheet metal externally fits the wall forming structural means.

5. An injector head for a rocket motor as defined in claim 1, wherein a substantially conical backing cone of sheet metal constitutes the external portion of the wall forming means; and wherein said wall forming means includes a corrugated basket of substantially conical form arranged with alternate outer corrugations contiguous to the backing cone, and flat, planar and substantially triangular longitudinal plates bridging the gaps between the respective adjacent inner corrugations and being edgewise united to the latter by fusion welding, whereby the grooves between adjacent inner and outer corrugations, respectively, form the passageways for the respective propellant fluids.

6. An injector for a rocket motor as defined in claim 1, wherein the passageways wall forming structural means is constituted by plural straight tubes united along the straight lines of adjacent tube contiguity.

References Cited in the file of this patent

UNITED STATES PATENTS

| | | |
|---|---|---|
| 2,523,656 | Goddard | Sept. 26, 1950 |
| 2,544,419 | Goddard | Mar. 6, 1951 |